United States Patent
Binford et al.

(10) Patent No.: US 6,366,965 B1
(45) Date of Patent: Apr. 2, 2002

(54) SYSTEM FOR UPDATING AN IDENTITY OF A DEVICE IN RESPONSE TO DETERMINING THAT A NEIGHBOR DEVICE HAS AN IDENTITY DIFFERENT FROM ONE STORED THEREIN

(75) Inventors: Charles D. Binford; Jeremy D. Stover, both of Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/223,877

(22) Filed: Dec. 31, 1998

(51) Int. Cl.$^7$ .............................................. G06F 13/14
(52) U.S. Cl. ................ 710/8; 710/11; 710/74; 711/114; 714/22; 709/227
(58) Field of Search ................ 710/8, 11, 74; 711/114; 714/22; 709/227

(56) References Cited

U.S. PATENT DOCUMENTS

| | | | |
|---|---|---|---|
| 5,471,099 A | * 11/1995 | Larabell et al. | 307/53 |
| 5,493,696 A | * 2/1996 | Wolf | 455/56.1 |
| 5,592,881 A | * 1/1997 | Rabjohns | 101/483 |
| 5,761,705 A | * 6/1998 | DeKoning et al. | 711/113 |
| 5,948,075 A | * 9/1999 | Osten | 710/8 |
| 5,975,738 A | * 11/1999 | DeKoning et al. | 364/184 |
| 6,012,143 A | * 1/2000 | Tanaka | 713/200 |
| 6,014,715 A | * 1/2000 | Stoevhase | 710/11 |
| 6,260,079 B1 | * 7/2001 | White | 710/8 |

\* cited by examiner

Primary Examiner—Thomas Lee
Assistant Examiner—Abdelmoniem Elamin (57) ABSTRACT

Methods and associated apparatus for generating and maintaining a unique identity for an enclosure in a storage system. Where an enclosure compliant with storage industry standards is to maintain a unique identity, methods of the present invention are operable to coordinate use of redundant devices within the enclosure that serve, among other functions, to store and report the unique identity of the enclosure. The redundant devices (i.e., environmental service cards or modules) assure that the enclosure identity remains unique among such enclosures despite hot or cold swaps of the redundant devices among the several enclosures. A change number portion of the unique identity value stored in each of the redundant devices is updated (i.e., incremented) each time a change in the configuration of redundant devices is detected by the devices. An incumbent one of the redundant devices reports the unique identity for the enclosure in response to attached system requests. By assuring a unique identity is generated in each redundant device upon sensing any change in the configuration of the redundant devices, the methods and apparatus of the present invention assure a unique identity for the enclosure is maintained and reported regardless of device swap operations (hot or cold devices swaps).

14 Claims, 10 Drawing Sheets

SYSTEM FOR UPDATING AN IDENTITY OF A DEVICE IN RESPONSE TO DETERMINING THAT A NEIGHBOR DEVICE HAS AN IDENTITY DIFFERENT FROM ONE STORED THEREIN

BACKGROUND OF THE INVENTION

1. Field of the Invention

The invention relates to a method for assuring unique identification of a device having redundant components storing the device identity, and more particularly, to a method for uniquely identifying an storage system enclosure having redundant environmental service cards that provide the unique identity of the enclosure so that the cards may be located in any storage enclosure or swapped between storage enclosures.

2. Description of Related Art

A computer system generally utilizes one or more data storage devices for persistent storage of information. In larger computer systems, storage systems having multiple data storage devices are often used to store correspondingly large amounts of information. A storage system may be equipped with one or more storage enclosures. These storage systems often integrate a number of data storage devices (e.g., tape drives, compact disks and disk drives or more simply "disks") into an enclosure (storage module) to store data accessible to a computer system.

As storage capacity requirements increase and multiple storage devices are utilized, reliability concerns relating to the storage system grow proportionally. A number of solutions have been implemented for providing reliability within a storage system. These solutions typically incorporate the use of redundant storage components. In general, redundant components are used such that when a first component (primary) fails, a second component (spare or redundant) immediately takes over the operations of the failed component. Such redundancy helps avoid loss of data or loss of access to data due to failure of a particular component in a storage system.

One such redundancy technique in storage systems is the use of redundant disk drives to increase reliability. In order to provide data reliability for the data stored on each of the disks in a storage system, the disks may be mirrored to increase reliability. Mirroring is the process of maintaining a duplicate copy of the data stored on a disk. The duplicate copy is maintained in synchronization with changes made to the original disk drive. Should the original disk drive fail, the duplicate disk drive may be used by the computer system to continue operation without loss of data.

Disk array systems (often referred to as RAID systems, an acronym for Redundant Array of Inexpensive Drives) use mirroring as one form of redundancy to enhance the reliability of disk storage devices. RAID systems also employ other techniques to enhance reliability of stored information. Other RAID techniques use parity (Boolean exclusive-or computed values) to provide redundancy information capable of regenerating data lost due to a disk drive failure. In general, RAID systems use redundancy (mirroring as well as other redundancy techniques) to assure reliable storage of data on the disk drives.

Modern storage systems (including RAID storage systems) are comprised of many components in addition to disk drives. Any one component could cause failure of the storage system. For example, although no disk drive, per se, fails, if the power supply that provides power to the disk drives fails, the effect is similar—stored data will be unavailable. Although data is not lost, its unavailability is the equivalent of a failure of the storage system in many applications.

To avoid such failures, modern storage systems include redundant components for many other components in the system. Storage systems that physically house components in modular enclosures may include redundant enclosures. In each enclosure are redundant components such as power supplies, communication paths to and from the storage devices (e.g., SCSI busses or Fibre Channel links), fans, disk controllers, storage devices, etc. Each of these other redundant components could be a point of failure in the storage system if not for the redundancy.

Large storage systems often include environmental service or monitoring devices or cards within each enclosure to monitor the redundant components and the environmental conditions within the storage enclosure. These environmental service cards sense failures of other redundant components in the enclosure. Such environmental service cards for monitoring purposes must also be redundant to help assure reliable operation. As with the disks, the system cannot have a single point of failure, thus, the need for total redundancy.

It is common to swap redundant components when a failure is sensed (or for other administrative and configuration reasons). For example, a failed component in one storage system may be removed and a replacement or repaired component may be inserted in its place. A swap that is performed with power to the system shut off is often referred to as a "cold swap." In addition, most modern storage systems also permit swapping of redundant components while a storage system is powered up and even operational. Such swaps are often referred to as "hot swaps" or "warm swaps."

An ideal solution for uniquely identifying any device is to record the ID in a component that cannot be removed from the device. A problem with a device that has such a fixed (non-removable) component is that the device's reliability is negatively impacted. The fixed component is a single point of failure that cannot be replaced to assure reliable access to the device. It is therefore preferred to record an ID for the device in a component that has a redundant mate to assure that there is no single point of failure of the device.

The environmental service card is often used as a repository to store and report a unique identifier associated with the storage enclosure in which it is housed. Standards for storage enclosure designs require a unique identifier be associated with the enclosure. In particular, the SCSI Enclosure Services ("SES") and the SCSI Accessed Fault-Tolerant Enclosure ("SAF-TE") standards require that fields be available to report the identifier of the enclosure.

Use of unique identifiers is common to many applications. For example, a unique identifier—a Social Security number—identifies each individual to the federal government (and other institutions). Or for example, each telephone in the national telephone system is identified by a unique identifier—a country code, area code and phone number.

Because redundant environmental service cards are swappable and capable of storing and reporting an enclosure identifier, a problem exists trying to coordinate which identifier to report after a hot or cold swap of an environmental service card. Therefore, a mechanism is necessary to report and store the proper identifier associated with the storage enclosure. It is important that an enclosure always report the same identifier as stored in its environmental service card(s). It is further important that no two enclosures report the same identifier.

A problem can occur if redundant environmental service cards in an enclosure are programmed with the same identifier and the cards are later swapped between different enclosures. For example, when the redundant environmental service card is taken from a first enclosure and inserted into a second enclosure within the system, the two enclosures would report the same identifier.

A partial solution is to always use the unique identifier programmed into a particular one of the redundant environmental service cards (i.e., always a first card or always a card in a particular physical location of the enclosure). However, even with such a partial solution, another problem can occur because the identifier will change if the chosen environmental service card is removed.

Existing identifier formats provide unique identifiers for enclosures having a single environmental service card, but do not specify a method whereby unique identifiers can be maintained for enclosures having redundant environmental service cards that are swapped among enclosures. Therefore, it is desirable to provide a method to ensure that enclosures having redundant environmental cards can be uniquely identified.

SUMMARY OF THE INVENTION

The present invention solves the above and other problems, thereby advancing the state of the useful arts, by providing unique identifiers and methods for generating same that allow storage enclosures to be uniquely identified and thereby addressed regardless of swaps of its environmental service cards that store the unique identifier.

More generally, the identifiers and methods of generation of the present invention are applicable to any device which requires a unique identity be maintained therefore and which uses redundant components to store and report such an identity. As noted above, use of such redundant components and swapping of such components enhances reliability of the devices as compared to a device having a fixed component for storing and reporting the identity of the device. The methods presented herein are primarily directed to application in storage systems where use of such identities and redundant components are common. However, those skilled in the art will understand the applicability of such techniques to any device having redundant components used to store and report the unique identity of the device.

In one preferred, exemplary embodiment, a change number field is maintained in NVRAM (non-volatile memory) for each redundant environmental service card. Each environmental services card views other redundant cards as "neighbors." As needed to assure unique identity, the change number is modified (i.e., incremented) for an environmental services card when it recognizes conditions which could cause later duplication of its present identity. The change number is combined with a pre-assigned environmental service card identifier, a permanent or static identifier, and the combination is stored as a unique identifier to be reported as the identity of the enclosure. Methods of the present invention help assure that the change number is altered only when necessary to assure a unique identity of the enclosure.

A preferred one of the redundant cards provides the unique identity of the enclosure in response to queries from attached systems. Preference is given to the incumbent card—the card that was not recently swapped into the enclosure or the one that first completes initialization in response to power on of the enclosure. Where none of the redundant cards is incumbent (i.e., all are non-incumbent), the ID generated by a card in a preferred position of the enclosure (i.e., in a preferred physical slot of the to enclosure) is used as the reported ID for the enclosure.

In a system employing multiple enclosures, the circuit cards can be interchanged between enclosures. A card that is hot (or warm) swapped into a hot enclosure will increment its change number field to reflect its sense of a new neighbor redundant device. The presently operating card, the new neighbor of the device just swapped into the host enclosure, records the new identity of the recently swapped neighbor.

Since the address of the storage enclosure is specified to be unique for every enclosure (or other peripheral device), and since the enclosure never assigns the same change number twice, the combination of the environment service card identifier and the change number ensures that the resulting enclosure identifier will also be unique regardless of swap operations performed on the redundant cards within the enclosure.

It is, therefore, an object of the present invention to provide a method for uniquely identifying a device with redundant components that identify the device.

It is an additional object of the invention to provide a method for identifying storage enclosures in a storage system, so that each storage enclosure retains a unique identifier.

It is still a further object of the invention to provide a method for identifying a device having redundant components such that the identity remains unique despite swaps of the redundant components that serve to identify the device.

It is still an additional object of the invention to provide a method for identifying enclosures in a storage system such that the identity remains unique despite swaps of circuit cards among storage systems.

It is a yet another objective of the invention to provide a method for uniquely identifying enclosures in a storage system such that the unique identifier is changed only when necessary.

The above and other objects, aspects, features, and advantages of the present invention will become apparent from the following detailed description and the attached drawings.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Exemplary System of the Present Invention

Figure 1:
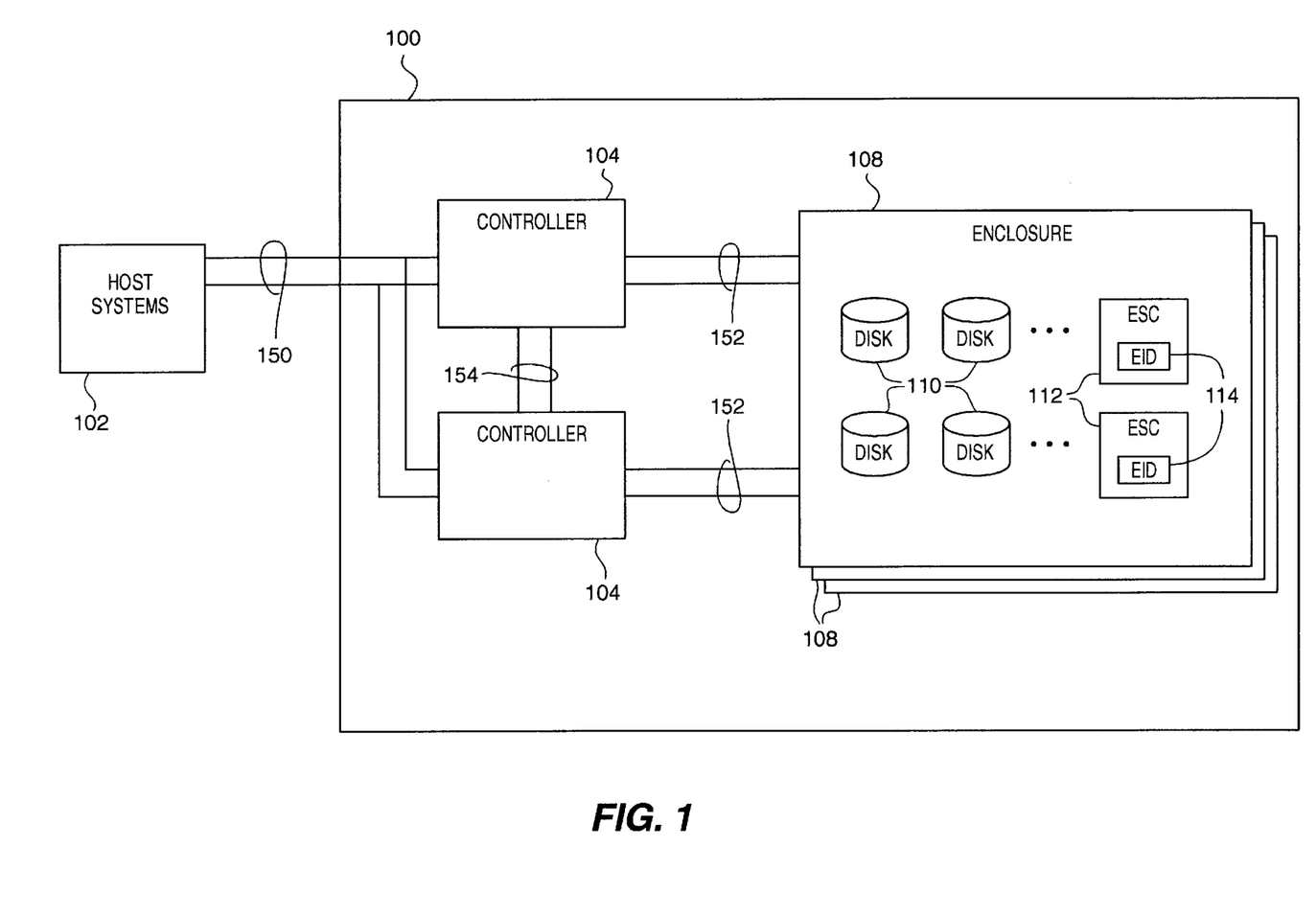
FIG. 1 is a block diagram of a storage system having enclosures in which the methods of the present invention are applicable.

FIG. 1 is a block diagram of an exemplary storage system 100 attached via path 150 to one or more host systems 102. Storage system 100 has a plurality of enclosures 108 each of which contain one or more disk drives 110 and one or more environmental services cards 114 (also referred to herein as ESC). As shown in FIG. 1, storage system 100 provides enhanced reliability through complete redundancy of components within the storage system. Controllers 104 provide redundant control of the host system 102 interactions. Host systems 102 are connected to the redundant controllers 104 via redundant paths 150. Controllers 104 preferably have an independent and redundant communication path 154 for exchange of information between the two controllers for purposes of coordinating the redundant operations. Within each enclosure 108, there is preferably a plurality of disk drives 110 and a plurality of environmental services cards 114 both for redundant control purposes.

Environmental services cards 114 provide a number of services within the storage system. Specifically, in the preferred embodiment, ESC 114 monitors a number of environmental parameters within its associated enclosure 108. Parameters such as cooling fan operation and efficacy, power supply thresholds, etc are all monitored by the ESC 114 to provide early warning to controller 104 of a potential failure in an enclosure 108. An additional function provided by the ESC 114 is to store and report a worldwide unique identifier representing its associated enclosure 108. At least two industry specifications for storage systems require a unique identifier be used for every enclosure in a storage system. Specifically, the SES (SCSI Enclosure Services standards) and the SAF-TE (SCSI Accessed Fault-Tolerant Enclosures standards) define fields for reporting of such information.

In the preferred embodiment, the environmental services cards 114 store and report such information on behalf of their corresponding enclosures 108. However, as noted above, where there are multiple ESCs 114 for redundancy requirements in each enclosure, it is a problem to assure that the enclosure ID reported for each enclosure remains unique despite hot or cold swaps of the ESCs 114 among enclosures. The methods and structure of the present invention therefore resolve this problem by assuring that no two enclosures can report an identical identity.

Figure 18:
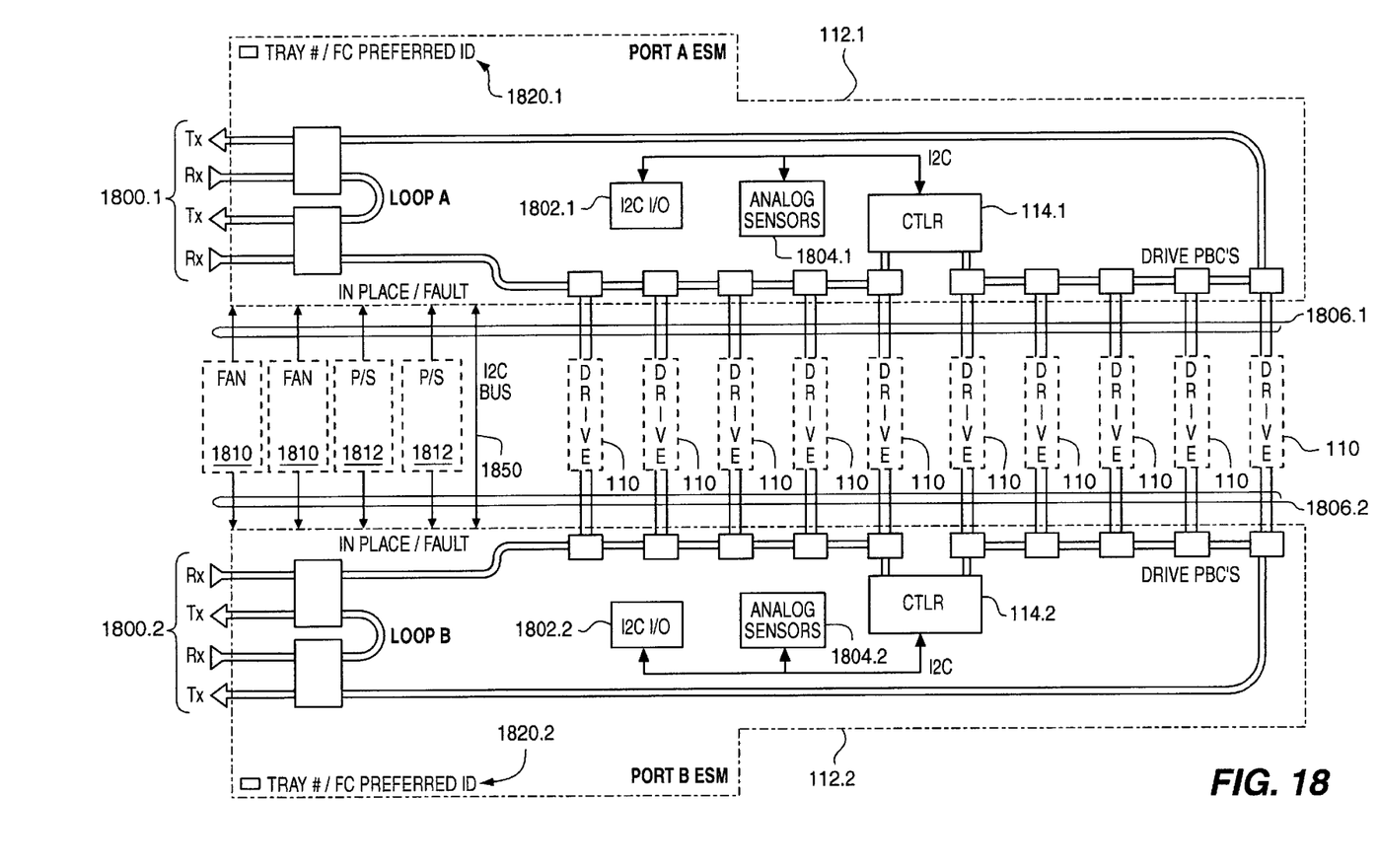
FIG. 18 is a block diagram of the configuration of a preferred embodiment of two ESC components in an enclosure of FIG. 1.

FIG. 18 is a block diagram providing additional details of the enclosures 108 of FIG. 1. Within an enclosure are two ESCs 112.1 and 112.2. Each ESC has a microcontroller 114.1 and 114.2, respectively. The microcontroller controls operation of the ESC including sensing of analog signals via sensors 1804.1 and 1804.2, respectively. Analog sensors are used, for example, to monitor ambient temperature within the enclosure. Each ESC is also connected via "mid-plane" connections 1806.1 and 1806.2, respectively, to each of the other redundant components within the enclosure. These other redundant components include disk drives 110, power supplies 1812 and fans 1810. Each of these redundant devices applies signals to each mid-plane connection indicative of its presence or absence in the enclosure and indicative of its proper functioning or fault condition.

In addition, the ESCs communicate with one another via a simple serial interface connection 1850 in the mid-plane connections. In the preferred embodiment, the serial connection 1850 is an $I^2C$ bus controlled by $I^2C$ controller 1802.1 and 1802.2, respectively. This communication link is used by the ESCs to exchange ID information as discussed further herein below. The ESCs also utilize the $I^2C$ communication path to notify one another when an ESC is hot swapped into the enclosure.

A signal applied to paths 1820.1 and 1820.2 identifies one of the two ESCs as the preferred component—the component physically plugged into a preferred slot of the enclosure.

In addition, each ESC is connected via redundant Fibre Channel loops with higher level storage controllers and/or host systems via paths 1800.1 and 1802, respectively.

Those skilled in the art will recognize that the preferred embodiment shown in FIG. 18 is intended as exemplary of many equivalent architectures. For example, two or more ESC components may be interconnected via mid-plane architectures such that all such components are interconnected and participate in the structure and methods of the present invention. Or, for example, other communication media and protocols may be applied to interconnect the redundant ESCs and the ESCs with other devices.

The present invention may be more fully understood with reference to FIGS. 2 through 15 that describe conditions before and after various ESC removal and swap operations. In addition, the present invention may be understood with respect to flowcharts presented herein below.

FIGS. 2 through 15 are diagrams showing before and after conditions for ESC cards in enclosures and the enclosure identities stored and reported as a result of the changes made between the before and after conditions. In FIGS. 2 through 15, the "before" condition is shown above a horizontal line 200 in the figure and the corresponding "after" condition is below the line 200. Each ESC in the figures shows a static or permanent identity stored in its non-volatile memory (NVRAM) and a reported identity. The permanent identity is shown as, for example, P=ABC where ABC is the permanent identity. The reported identity is shown as, for example, R=ABC where ABC is the reported identity stored in the ESC.

Figure 2:
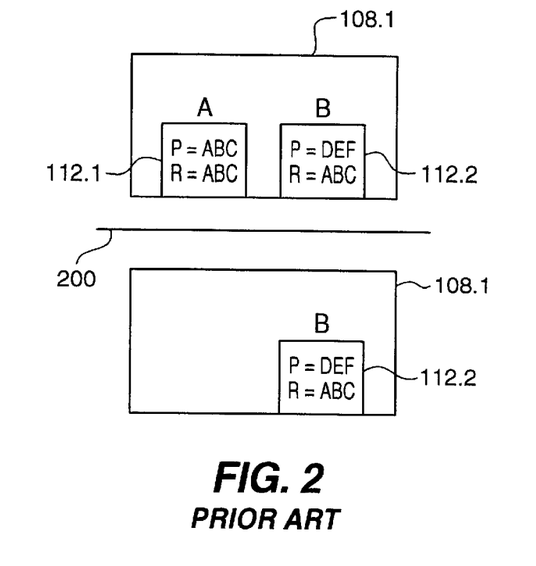
FIGS. 2 and 3 illustrate problems of prior techniques when swapping environment service cards among enclosures.
Figure 3:
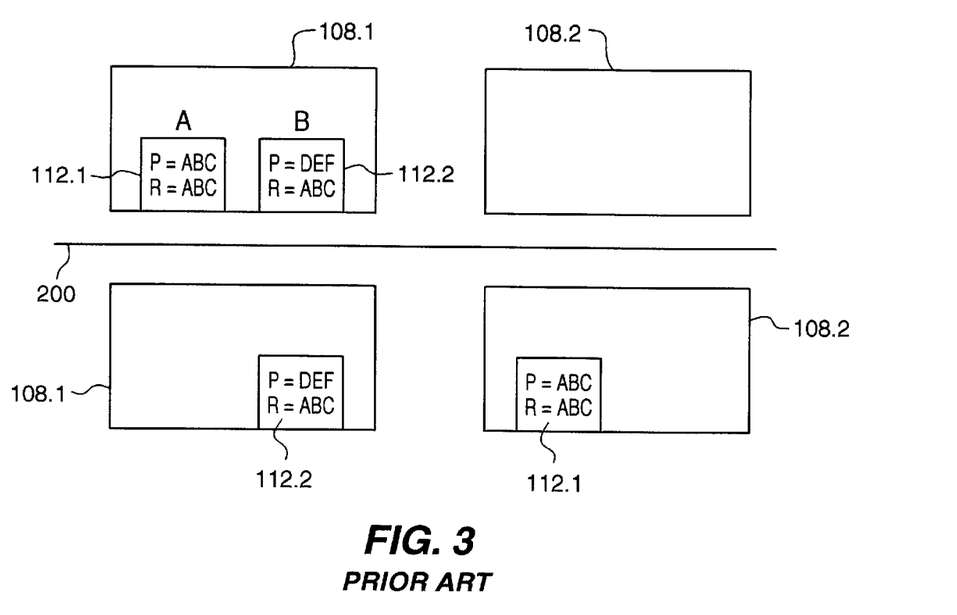

FIGS. 2 and 3 are diagrams showing before and after conditions for removal of a redundant ESC from an enclosure in accordance with prior known techniques. The problems of such prior known techniques are thereby illustrated. Specifically, FIG. 2 shows a before and after condition where one of two redundant ESCs 112.1 and 112.2 is removed from an enclosure 108.1. The "before" condition is depicted above the horizontal line 200 of the figure and the "after" condition is shown below the horizontal line 200 of the figure. In particular, FIG. 2 shows enclosure 108.1 having two ESCs 112.1 and 112.2, respectively. ESC 112.1 is in physical slot A of enclosure 108.1 while ESC 112.2 is in physical slot B of enclosure 108.1. ESC 112:1 has a permanent or static ID of ABC and a reported ID of ABC. ESC 112.2 has a permanent ID of DEF and a reported ID of ABC. As noted above, known techniques permit such redundant ESCs to coordinate a common reported ID based on a preference for, for example, a first slot such as slot A of enclosure 108.1. The "after" condition of FIG. 2 depicts the state following hot removal of ESC 112.1 from slot A of enclosure 108.1. The remaining ESC 112.2 in slot B of enclosure 108.1 therefore continues to report an ID of ABC for the enclosure. This condition in isolation is not a problem. A problem arises however when the removed ESC 112.1 is then swapped into a second enclosure.

FIG. 3 shows a before and after condition for the hot swap of an ESC from a first enclosure to a second enclosure as presently known in the art. As noted above with respect to FIG. 2, the hot removal of an ESC from an enclosure leaves the ID of that enclosure unchanged as presently practiced in the art. The before condition of FIG. 3 shows the same condition as FIG. 2 wherein an enclosure 108.1 has a first ESC 112.1 in slot A reporting an ID of ABC and a second ESC 112.2 in slot B also reporting an ID of ABC. In the "after" condition of FIG. 3, the first enclosure 108.1 retains the ID of ABC because the hot removal of the first ESC 112.1 does not alter the ID of the enclosure. However, the second enclosure 108.2 also reports an ID of ABC because the ESC 112.1 removed from the first enclosure 108.1 has not changed its permanent ID. This causes two enclosures to report the same ID. Two enclosures reporting the same world-wide unique identifier is an unacceptable condition violating the specifications of the applicable enclosure standards. This condition is precluded by the methods and structures of the present invention as described further herein below.

FIGS. 4 through 15 are similar before/after condition diagrams describing operation of methods of the present invention that preclude any two enclosures from reporting the same ID. As noted herein in accordance with the present invention, the permanent ID ("P") is combined with a change number field (C) to generate a unique identifier for the enclosure—namely the reported ID (R). Reported IDs (R) shown in FIGS. 4 through 15 are therefore depicted in a form AAA.N where AAA is a static portion of the identifier adopted from the permanent ID (P) of one of the redundant ESCs and N is the change number portion (C) that is adjusted by the methods of the present invention.

The reported ID presently known within an ESC card is also referred to herein as a local ID or local identity. The local identity of a neighboring card is read by an ESC to determine whether the ID for the neighbor has changed. In so doing, the local identity of the neighboring ESC is referred to herein as neighbor local ID or neighbor local identity. When an ESC saves the read neighbor local ID in its non-volatile memory, the saved copy is also referred to herein as saved neighbor local ID or saved neighbor local identity.

Any of a variety of industry standards may be used to format the unique identifiers so stored and generated. On common format used to exchange world-wide identifiers in Fibre Channel applications is the IEEE extended format. This format uses a 64 bit field to specify a world-wide unique identifier for a Fibre Channel device. In particular, the Fibre Channel Physical specifications version 4.3 at section 19.3.2.2 calls for the high four bits of the field to be used as a format identifier, the lower 48 bits as a IEEE device ID and the remaining 12 bits as a port identifier for multiple port devices. A preferred embodiment of the present invention redefines the use of the 12 bit port field to be the change number portion of the identifier as specified herein. Those skilled in the art will recognize a wide variety of similar identifier formats that may incorporate the features of the present invention to assure unique identity of an enclosure as stored and maintained in swappable, redundant components of the enclosure.

Use of the 12 bit port field for the change number portion of the unique ID limits the number of such changes to approximately 4096. Methods of the present invention modify the stored change number only when necessary. Exceeding 4096 such alterations would cause the change number as represented in the IEEE extended format port field to wrap and thereby re-use previously assigned IDs. Those skilled in the art will recognize that such conditions may be reported as errors to allow operator intervention to reset ID values to assure continued uniqueness. However, as a practical matter, this limit of 4096 changes is believed to present no practical problem. It is highly unlikely that component failures and resultant component swaps would ever occur so frequently as to require such a large number of component swaps.

Exemplary Unique ID Generation of the Present Invention

Figure 4:
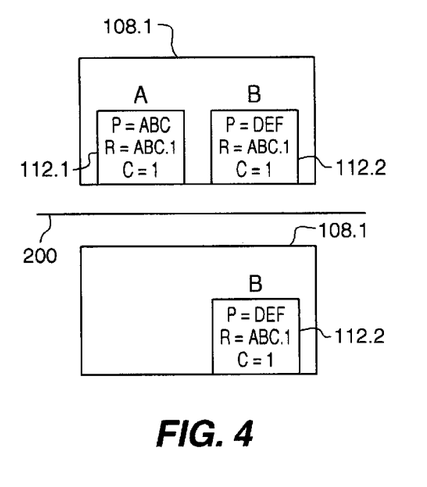
FIGS. 4 and 5 depict the identity changes in accordance with the present invention in response to hot removal of one of two redundant environmental services cards in an enclosure.
Figure 5:
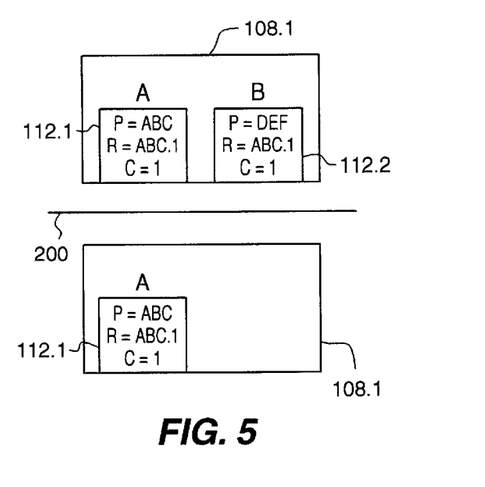

FIGS. 4 and 5 are before/after diagrams of a hot removal of one ESC 112.1 from an enclosure 108.1. A hot removal is a removal of an ESC card (or any component of the enclosure) while the enclosure is powered on and generally operable. In the after condition of FIG. 4, ESC 112.2, the remaining ESC following removal of 112.1, continues to report the same identity for enclosure 108.1, namely R=ABC.1. Similarly, as depicted in FIG. 5, hot removal of ESC 112.2 causes remaining ESC 112.1 to report the same identity for enclosure 108.1, namely R=ABC.1. Other than appending the change number portion (C=1) to the identity, this aspect of the present invention is similar to the corresponding hot removal process as presently practiced in the art and as shown in FIG. 2 above. However, as will be seen further below, addition of the change number portion to the identity is a key aspect of the methods of the present invention to preclude two enclosures from reporting the same identity.

Figure 6:
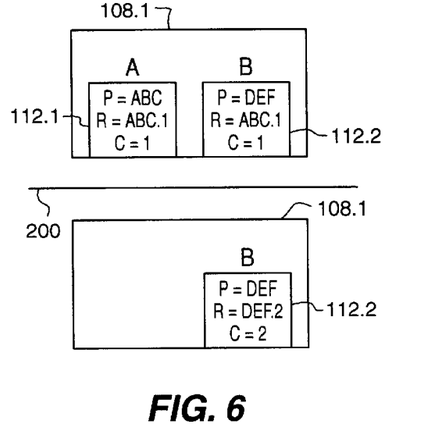
FIGS. 6 and 7 depict the identity changes in accordance with the present invention in response to cold removal of one of two redundant environmental services cards in an enclosure.
Figure 7:
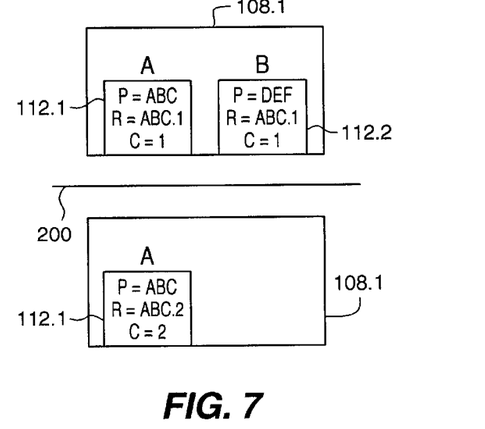

FIGS. 6 and 7 are before/after diagrams of a cold removal of one ESC 112.1 from an enclosure 108.1. A cold removal is a removal of an ESC card (or any component of the enclosure) while the enclosure is powered off and generally inoperable. In the after condition of FIG. 6, ESC 112.2, the remaining ESC following cold removal of 112.1, reports a new identity for enclosure 108.1 after re-initializing, namely R=DEF.2. It will be noted that the change number portion of the ID has been modified to reflect that the ESC card has detected a change in its neighbor, namely the removal of the neighbor that was previously present in the same enclosure. Similarly, as depicted in FIG. 7, cold removal of ESC 112.2 causes remaining ESC 112.1 to report a new identity for enclosure 108.1, namely R=ABC.2 wherein the change number has been altered (i.e., C=2) by the methods of the present invention to assure a unique identity for all enclosures.

Figure 8:
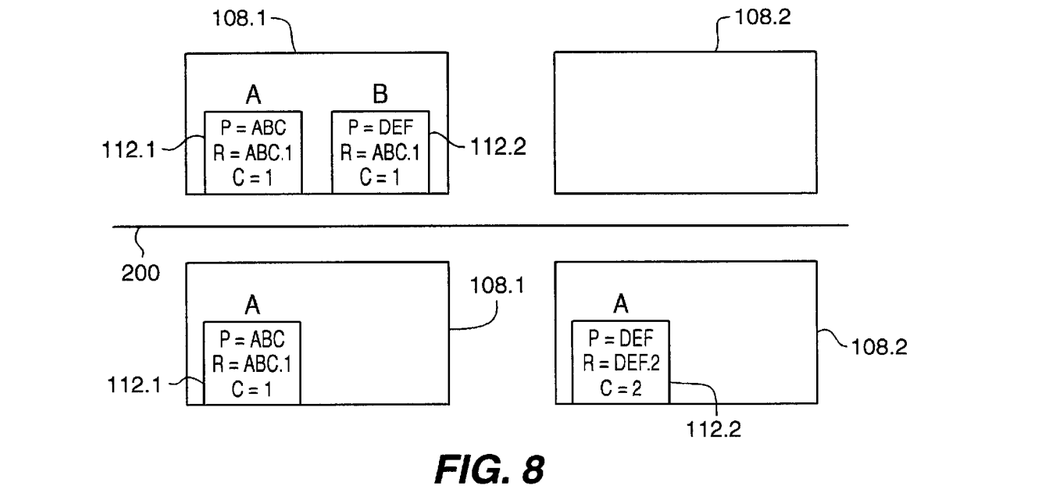
FIGS. 8 and 9 depict the identity changes in accordance with the present invention in response to hot swap of one of two redundant environmental services cards from a first enclosure to a second enclosure presently devoid of environmental services cards.
Figure 9:
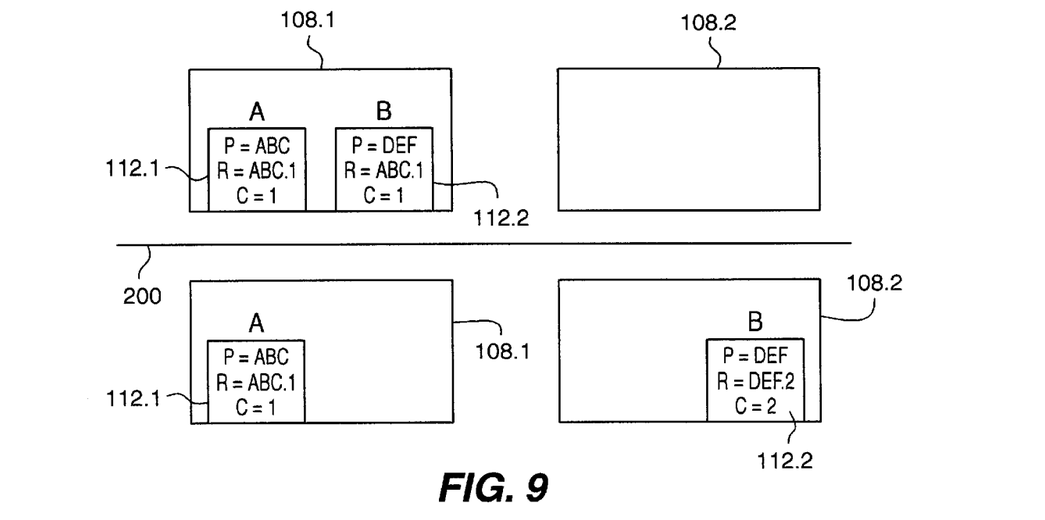

FIGS. 8 and 9 are before/after condition diagrams describing the management of a hot swap of an ESC from one enclosure to another in accordance with the present invention. In FIG. 8, a first enclosure 108.1 has two ESCs 112.1 and 112.2 reporting the same ID namely R=ABC.1. The second ESC 112.2 has a permanent ID of P=DEF. After a hot swap of ESC 112.2 from enclosure 108.1 to enclosure 108.2, ESC 112.1 continues to report the same ID for enclosure 108.1. Enclosure 108.1 has not yet encountered a reason to change its reported ID. ESC 112.2 is now swapped into enclosure 108.2 (in the primary position—slot A), is therefore re-initialized, and has been updated with an altered change number (C=2). Since ESC 112.2 is the only ESC in the second enclosure 108.2, it reports the ID of the enclosure as the permanent ID combined with the present (updated) change number, namely R=DEF.2. FIG. 9 shows a similar hot swap wherein the second ESC 112.2 is swapped into the secondary position (slot B) of the second enclosure 108.2. Again, since ESC 112.2 is the only ESC in enclosure 108.2, the updated change number with the permanent ID is used as the reported ID.

Figure 10:
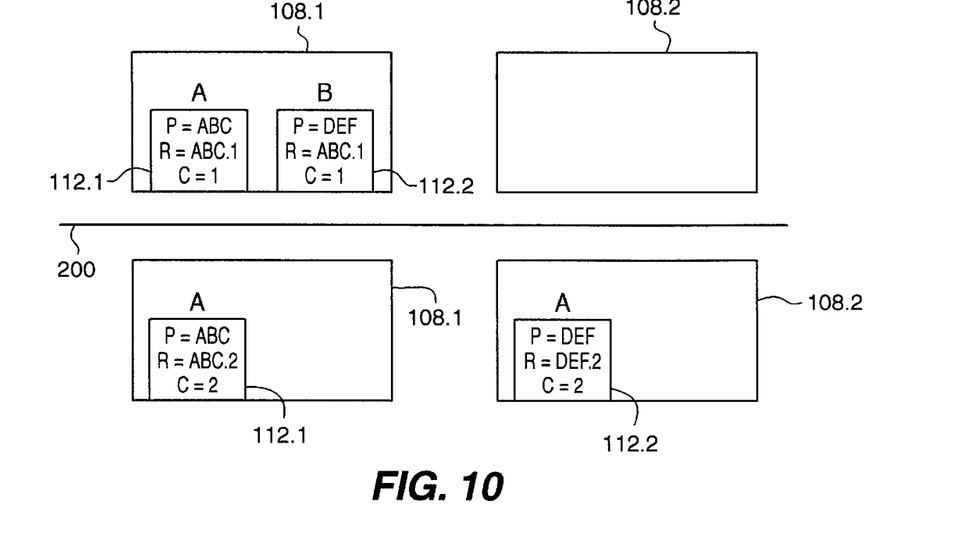
FIGS. 10 and 11 depict the identity changes in accordance with the present invention in response to cold swap of one of two redundant environmental services cards from a first enclosure to a second enclosure presently devoid of environmental services cards.
Figure 11:
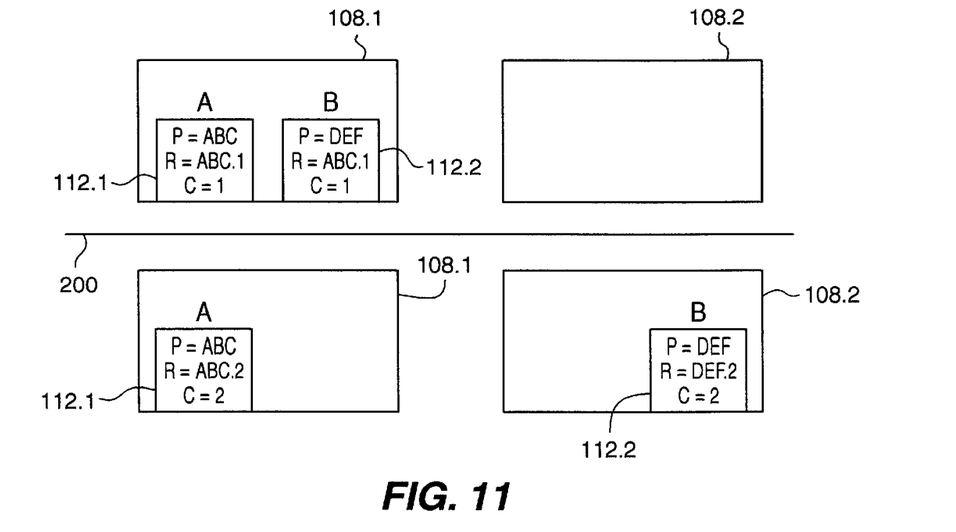

FIGS. 10 and 11 are before/after condition diagrams describing the management of a cold swap of an ESC from one enclosure to another in accordance with the present invention. The description of FIGS. 10 and 11 are identical to that of FIGS. 8 and 9 except that the remaining ESC 112.1 in enclosure 108.1 in each of FIGS. 10 and 11 updates its reported ID with a new change number. The ESC updates its change number in recognition of the change of its neighbor, the removed ESC 112.2. The new reported identity for the remaining ESC 112.1 and hence the enclosure 108.1 is R=ABC.2.

Figure 12:
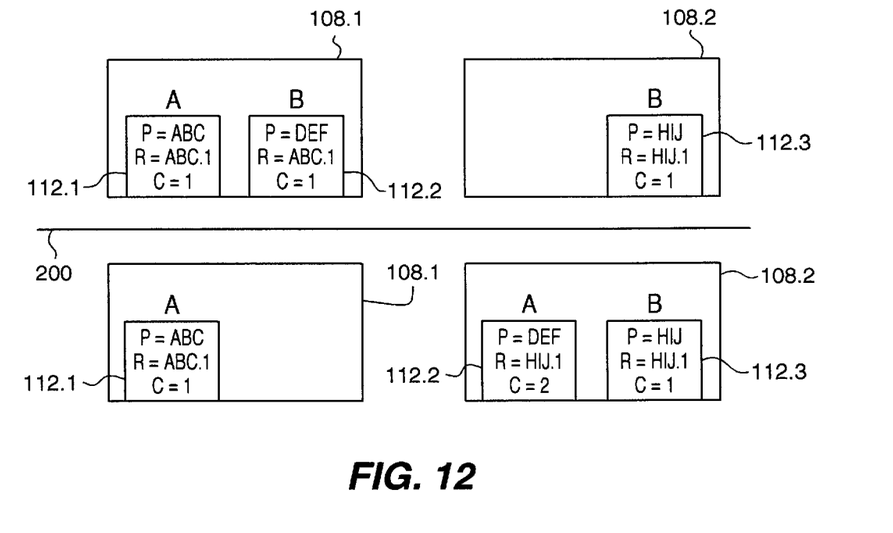
FIGS. 12 and 13 depict the identity changes in accordance with the present invention in response to hot swap of one of two redundant environmental services cards from a first enclosure to a second enclosure presently populated with one environmental services cards.
Figure 13:
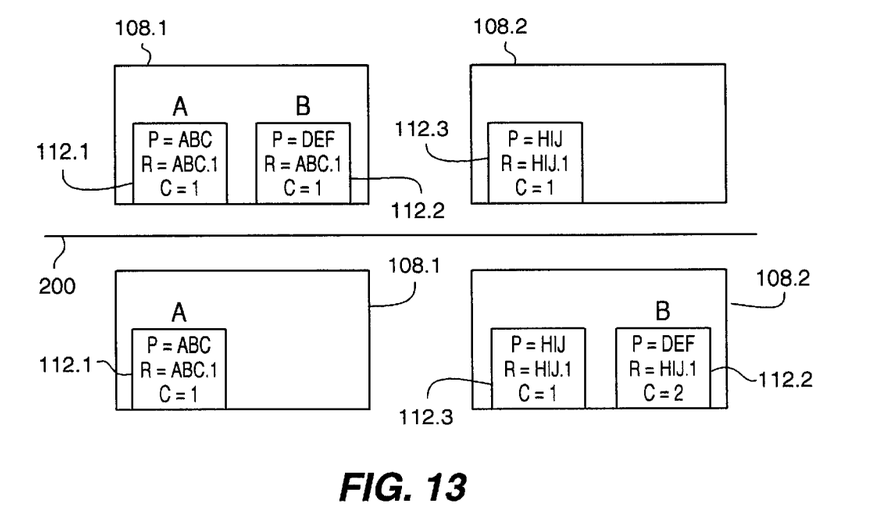

FIGS. 12 and 13 are before/after condition diagrams describing the management of a hot swap of an ESC from one enclosure to another in accordance with the present invention. The description of FIGS. 12 and 13 differ from FIGS. 8 and 9 in that the removed ESC is inserted into an enclosure that already has an incumbent ESC—one that is initialized and operable to report an identity for the enclosure. As in FIGS. 8 and 9, the ESC 112.1 that remains in the first enclosure 108.1 need not change its reported identity. The removed ESC 112.2 is hot swapped into an enclosure with an incumbent ESC 112.3 in slot B in FIG. 12 and in slot A in FIG. 13. Since the ESC 112.3 already present in the second enclosure 108.2 is incumbent, the newly inserted ESC 112.2 adopts the reported identity of the incumbent ESC 112.3, namely R=HIJ.1. Since the incumbent ESC 112.3 is known to have a presently unique reported identity, the newly inserted ESC may safely adopt it as its own reported ID. However, the newly inserted ESC 112.2 updates its change number C=2 to reflect its recognition that the old permanent ID may be duplicated.

Figure 14:
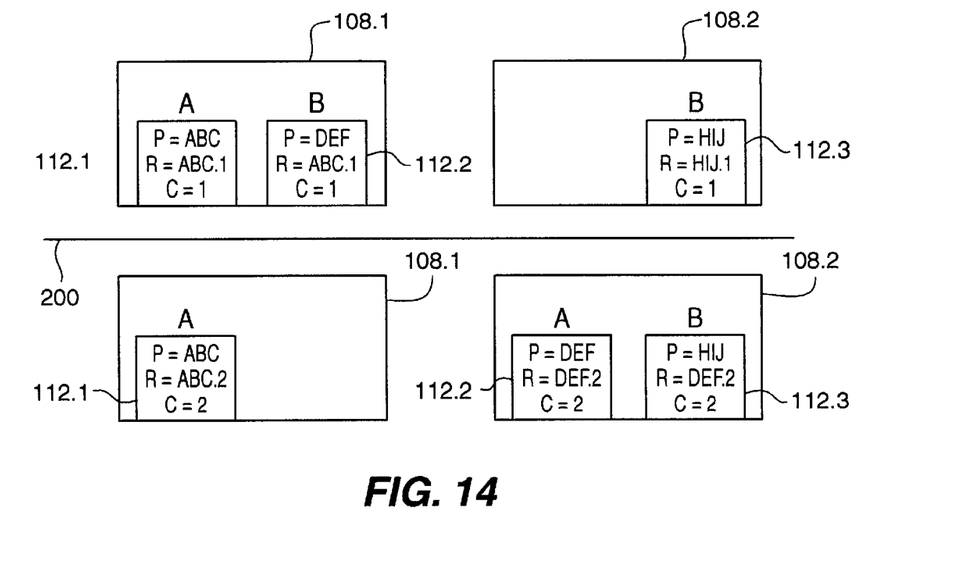
FIGS. 14 and 15 depict the identity changes in accordance with the present invention in response to cold swap of one of two redundant environmental services cards from a first enclosure to a second enclosure presently populated with one environmental services cards
Figure 15:
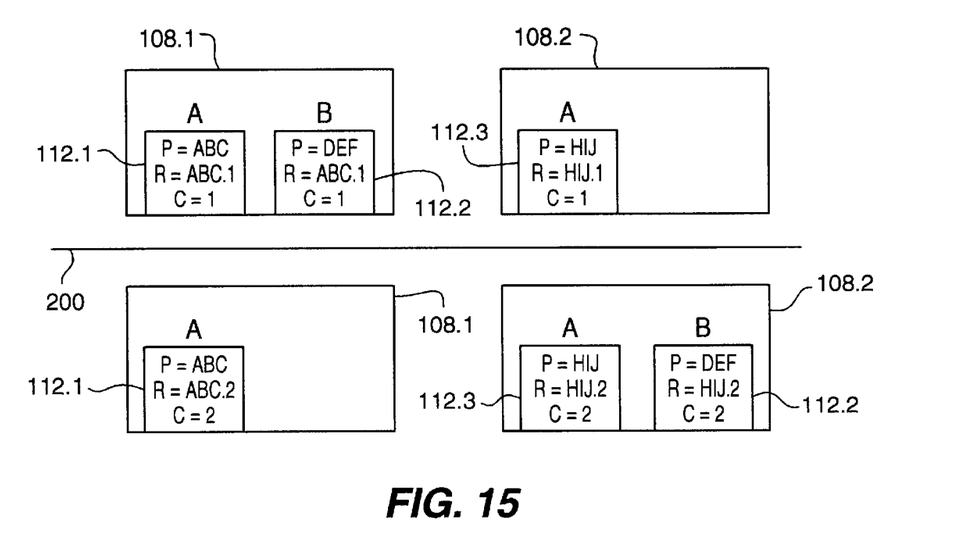

FIGS. 14 and 15 are before/after condition diagrams describing management of cold swaps of ESCs between a first and second enclosure. Unlike FIGS. 12 ad 13, the remaining ESC 112.1 in the first enclosure 108.1 in both FIGS. 14 and 15 updates its reported ID with a new change number in recognition of a change in its present neighbor—namely the removal of ESC 112.2. Further, unlike the conditions of FIGS. 12 and 13, the power up initialization of the second enclosure 108.2, now housing the cold swapped ESC 112.2, updates the change number of both ESCs resident therein, namely 112.3 and 112.2. Specifically, ESC 112.2 updates its change number to C=2 in recognition of a change in its present neighbor. Likewise, ESC 112.3 updates its change number to C=2 also in recognition of its new neighbor. The two ESCs then select which permanent ID to use to generate the new reported ID based on which is ESC resident in a preferred or primary position in the enclosure 108.2. In this preferred embodiment, slot A is considered the preferred or primary position of the enclosures. Therefore, in FIG. 14, both ESC 112.2 and 112.3 adopt the permanent ID in slot A combined with the present change number as their respective reported IDs, namely R=DEF.2. In FIG. 15, the permanent ID in preferred slot A is P=HIJ the ID adopted by both ESCs 112.2 and 112.3 as their respective reported IDs is R=HIJ.2.

ID Generation Methods

Figure 16:
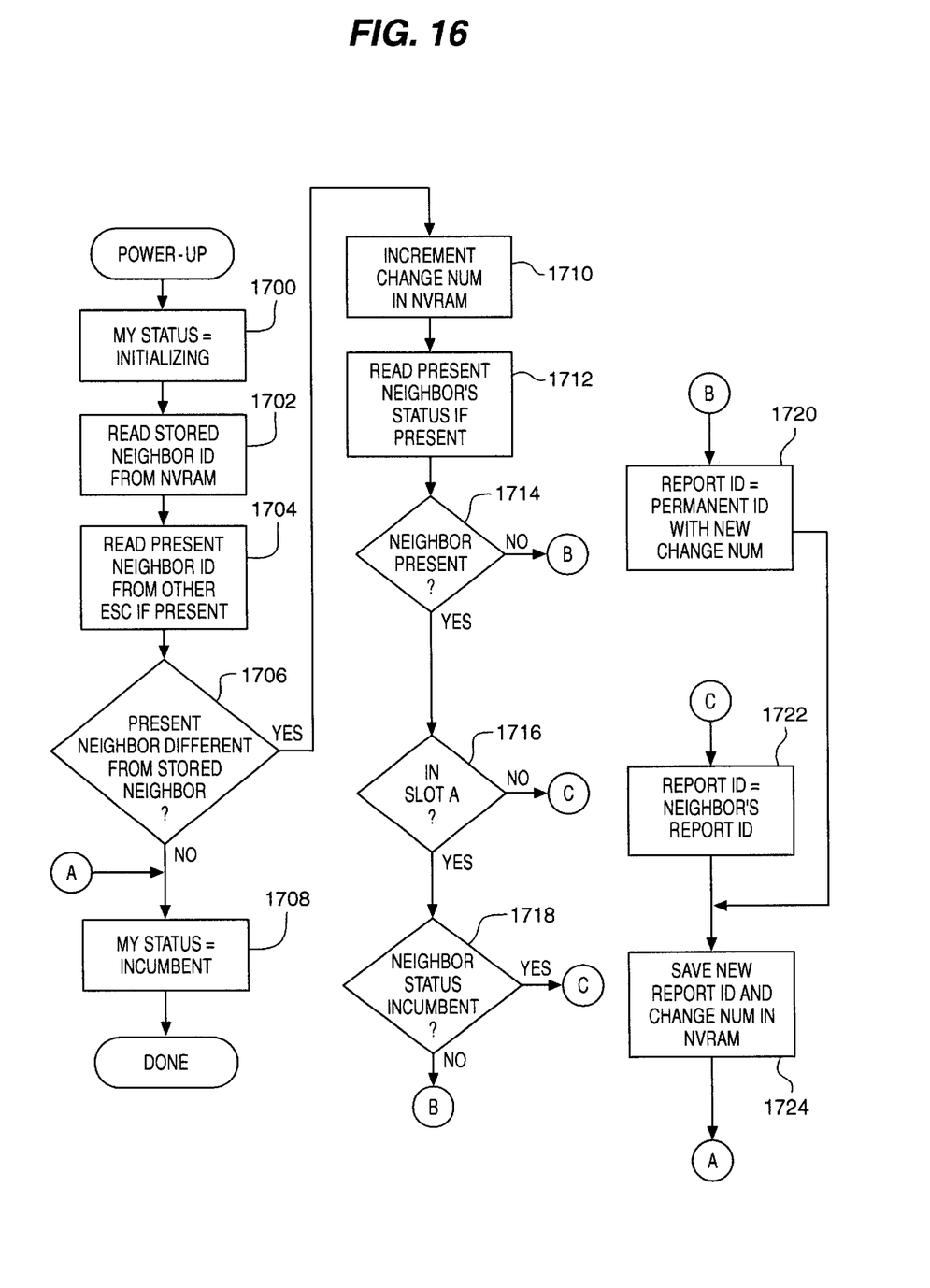
FIG. 16 is a flowchart describing a method of the present invention for initializing an environmental services card as in FIGS. 1 and 2 in response to application of power to the card.

FIG. 16 is a flowchart describing the operation of a method of the present invention operable within each ESC of an enclosure in response to power on initialization of the ESC. An ESC may be so initialized in response to power up of the enclosure or may perform the same operations in response to being swapped into a previously powered up enclosure—a swap into a "hot" enclosure or simply a "hot swap."

Element 1700 is first operable to assign a status to the ESC indicative of its initializing state. Element 1702 then reads the identity of the neighboring ESC from non-volatile memory (NVRAM) of the ESC. The permanent ID of the last known neighbor of the ESC is recorded in the ESC's memory. Element 1704 then reads the permanent identity information from the present neighboring ESC, if any. If no neighboring ESC is present, element 1704 sets an indicator as such as the read identity (i.e., a "not-present" identity value).

Element 1706 is next operable to determine whether the present neighbor as identified by the read of the present neighbor's ID is the same as the stored neighbor ID information read from the ESC's NVRAM storage. If the present neighbor is the same as that last detected and stored in the ESC's NVRAM, the method is completed with element 1708 setting the status of the ESC to incumbent. If not, processing continues with element 1710.

Element 1710 is operable to increment the change number in the ESC's NVRAM to indicate that the ESC has detected a change in its neighboring ESC. The change number is then used in generating a new, unique identifier for the ESC as discussed herein below. Element 1712 then reads the present status of the neighboring ESC (if present—else a not-present status is returned). The tests performed by elements 1714 through 1718 then determine what reported ID should be used by the ESC.

Element 1714 determines whether a neighbor ESC is present in the enclosure. If not, processing continues with element 1720 to adopt the permanent ID of the ESC with an altered change number as the reported ID of the ESC. Processing then continues with element 1724 as discussed below.

If element 1714 determines that a neighbor is present, elements 1716 and 1718 are then operable to determine whether the ESC is in the primary or preferred position of the enclosure and whether the neighboring ESC is already incumbent, respectively. As noted above, a physical position in the enclosure is deemed preferred for purposes of selecting a new reporting ID from among the two redundant ESCs. As discussed herein above, slot A, for example, as shown in the figures is the preferred position for the enclosure.

If elements 1716 and 1718 in combination determine that the ESC is in the preferred slot A and that the neighboring ESC is not incumbent, then processing continues with element 1720 to adopt the permanent ID of the ESC with the new change number as the reported ID for the ESC. Otherwise, if either the ESC is not in slot A or if the neighbor ESC is incumbent, then processing continues at element 1722 and the neighbor's present report ID (as read from the neighbor earlier) is used as the report ID of this ESC. In both cases, processing continues with element 1724

Element 1724 is operable to save the newly adopted report ID and the present change number in the ESC's NVRAM. Processing then completes with element 1708, as above, to set the status of the ESC to incumbent.

Since both redundant ESC's run the identical method, both ESC's will adopt the same reported ID changed as needed by the updated change number.

Figure 17:
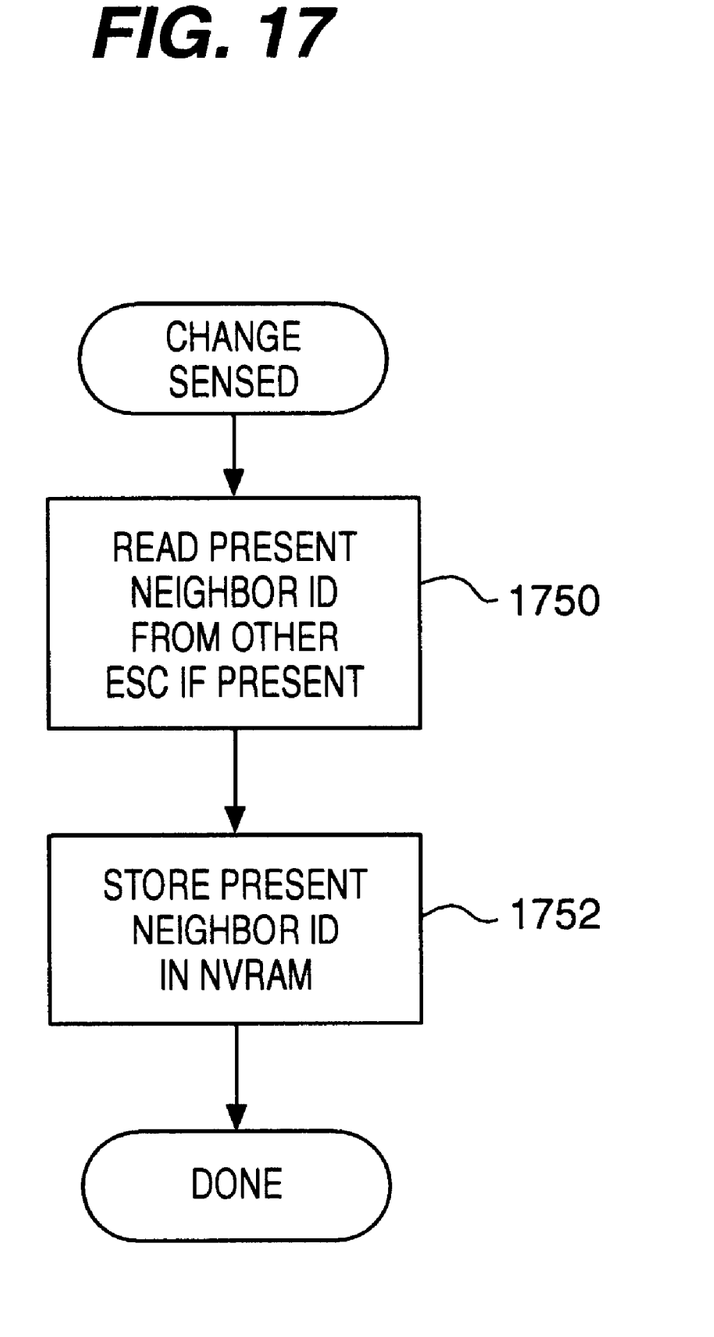
FIG. 17 is a flowchart describing a method of the present invention for updating information in an incumbent environmental services card in response to sensing a change in the neighboring card.

FIG. 17 is a flowchart describing a method of the present invention operable within a hot (operating) ESC to detect a change in its neighbor. When a neighbor is removed or inserted in a hot enclosure, this method is operable in the hot ESC (the ESC present in the enclosure when the neighbor is inserted or removed) to note the change in its neighbor. Specifically, element 1750 is first operable to read the present neighbor ID information from the neighbor ESC (the permanent ID on the neighbor ESC). Element 1752 then stores the read information in the NVRAM of the ESC. This allows the ESC to detect a change in the neighbor as described above with respect to elements 1702 through 1706. Where the neighbor is not present, the ID "read" and therefore stored is a reserved ID indicative of the condition—namely a reserved ID that indicates "neighbor not present."

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a storage system having an enclosure containing redundant devices that serve to identify said enclosure, a method for generating a unique identity for said enclosure comprising the steps of:
    determining, in a first device of said redundant devices, a neighbor local identity of said enclosure presently stored as a local identity in a second device of said redundant devices;
    comparing said neighbor local identity to a saved neighbor local identity stored in said first device;
    updating a local identity in said first device in response to the comparison determining that said neighbor local identity is different from said saved neighbor local identity;
    detecting, in said first device, a status of said second device;
    selecting, in said first device, said local identity in said first device as said unique identity for said enclosure in response to a detection of a first status of said second device; and
    selecting, in said first device, said neighbor local identity in said second device as said unique identity for said enclosure in response to detection of a second status of said second device.

2. The method of claim 1 wherein said local identity comprises a fixed portion and a change number portion and wherein the step of updating comprises the step of:
    altering said change number portion from a present value to a next sequential value.

3. The method of claim 2 wherein said local identity and said neighbor local identity and said saved neighbor local identity are represented in an IEEE Extended format and wherein the port identifier portion of said IEEE Extended format is used for said change number portion.

4. The method of claim 1
    wherein the step of detecting a status comprises the step of determining the present status of said second device as nonexistent, and
    wherein the step of selecting said local identity comprises the step of adopting said local identity of said first device as said unique identity of said enclosure in response to detecting the status of said second devices as nonexistent.

5. The method of claim 1
    wherein the step of detecting a status comprises the step of determining the present status of said second device as non-incumbent, and
    wherein the step of selecting said local identity comprises the step of adopting said local identity of said first device as said unique identity of said enclosure in response to detecting the status of said second devices as non-incumbent.

6. The method of claim 1
    wherein the step of detecting a status comprises the steps of:
        determining that said first device is in a primary position in said enclosure; and
        determining the present status of said second device as non-incumbent, and
    wherein the step of selecting said local identity comprises the step of adopting said local identity of said first device as said unique identity of said enclosure in response to determining that said first device is in a primary position in said enclosure and in response to determining the status of said second devices as non-incumbent.

7. The method of claim 1 further comprising the step of:
    updating said saved neighbor local identity in response to detecting a changed in said neighbor local identity as compared to said saved neighbor local identity.

8. In a storage system having an enclosure containing redundant devices that serve to identify said enclosure, a method operable within said redundant devices for generating a unique identity for said enclosure comprising the steps of:
    detecting, within at least one device of said redundant devices, a change in a local identity stored in at least one of said redundant devices;
    generating, within said redundant devices, a new unique identity for said enclosure in response to detection of said change wherein said new unique identity is derived from a local identity stored in at least one of said redundant devices; and
    using said new unique identity in said redundant devices such that both of said redundant devices return said new unique identity in response to a request for said unique identity of said enclosure.

9. The method of claim 8 wherein the step of using comprises the steps of:
    storing said new unique identity as a reported identity value in both of said redundant devices; and
    reporting said reported identity value in response to a request for identity of said enclosure from an attached system.

10. The method of claim 8 wherein said local identity comprises a fixed portion and a change number portion and wherein the step of generating comprises the step of:

altering said change number portion from a present value to a next sequential value.

11. The method of claim 8 wherein the step of detecting comprises the steps of:

determining, within a first device of said redundant devices, a present local identity value stored in a second device of said redundant devices; and comparing, within said first device, a previously determined local identity from said second device with said present local identity to detect a change in a local identity stored in at least one of said redundant devices.

12. The method of claim 8 wherein the step of generating comprises the steps of:

selecting a local identity of one of said redundant devices for use as said new unique identity in accordance with the present status of each of said redundant devices.

13. The method of claim 12 wherein the step of selecting comprises the step of:

adopting the local identity within a first device of said redundant devices for use as said new unique identity in response to detecting that a second device of said redundant devices is non-existent.

14. The method of claim 12 wherein the step of selecting comprises the step of:

adopting the local identity within a first device of said redundant devices for use as said new unique identity in response to detecting that said first device is present in a preferred position of said enclosure and that said first device is presently not in an incumbent state.

* * * * *